(12) United States Patent
Couch, III

(10) Patent No.: US 8,465,824 B2
(45) Date of Patent: Jun. 18, 2013

(54) STRAP FOR SECURING ACCESSORIES TO PHOTOGRAPHIC FLASH UNITS

(76) Inventor: Quest C. Couch, III, New Braunfels, TX (US)

( * ) Notice: Subject to any disclaimer, the term of this patent is extended or adjusted under 35 U.S.C. 154(b) by 327 days.

(21) Appl. No.: 12/885,304

(22) Filed: Sep. 17, 2010

(65) Prior Publication Data

US 2012/0070610 A1  Mar. 22, 2012

(51) Int. Cl.
*B32B 3/06* (2006.01)
*B23P 19/04* (2006.01)

(52) U.S. Cl.
USPC ............ 428/100; 428/98; 428/99; 428/101

(58) Field of Classification Search
USPC .................... 428/100, 98, 99, 101
See application file for complete search history.

(56) References Cited

U.S. PATENT DOCUMENTS

| | | | |
|---|---|---|---|
| 2,461,201 A | 2/1949 | Ellis | |
| 3,869,764 A | 3/1975 | Umezu | |
| 4,198,734 A | 4/1980 | Brumlik | |
| 4,887,339 A | 12/1989 | Bellanger | |
| 5,311,409 A | 5/1994 | King | |
| 5,778,264 A | 7/1998 | Kean | |
| 6,035,498 A | 3/2000 | Buzzell et al. | |
| 6,194,629 B1 * | 2/2001 | Bernhard | 602/41 |
| 6,489,003 B1 | 12/2002 | Levitt et al. | |
| 6,899,841 B2 | 5/2005 | Buzzell et al. | |
| 7,141,283 B2 | 11/2006 | Janzen et al. | |
| 7,722,201 B2 | 5/2010 | Manger | |
| 2002/0078536 A1 | 6/2002 | Martin et al. | |
| 2004/0088835 A1 | 5/2004 | Tachauer et al. | |
| 2007/0232973 A1 * | 10/2007 | Serola | 602/19 |
| 2010/0037371 A1 * | 2/2010 | Lewis | 2/340 |

OTHER PUBLICATIONS http://www.honlphoto.com/servlet/the-8/strobist-speedlight-strobe-flash/Detail, Website Accessed Dec. 8, 2010 (2 pages).
http://web.archive.org/web/20080430160049/http://www.honlphoto.com/servlet/the-8/strobist-speedlight-strobe-flash/Detail, Downloaded from web site (apparently available Apr. 30, 2008) (1 page).
http://web.archive.org/web/20060818231709/http://www.textol.com/t_sewon.asp, Downloaded from web site (apparently available Aug. 18, 2006) (2 pages).
http://web.archive.org/web/20071013091943/http://textol.com/t_velstretch.asp, Downloaded from web site (apparently available Oct. 13, 2007) (2 pages).

* cited by examiner

*Primary Examiner* — Brent O'Hern
(74) *Attorney, Agent, or Firm* — Cox Smith Matthews Incorporated

(57) ABSTRACT

A strap for fastening an accessory to a photographic flash unit may have a stretchable substrate; an outer fastener strip attached to the stretchable substrate, the outer fastener strip having one of hook fastener material and loop fastener material; and an inner fastener strip attached to the stretchable substrate, the inner fastener strip having the other of hook fastener material and loop fastener material; wherein the outer fastener strip has at least one slack region having an amount of slack when the stretchable substrate is in an undeflected condition.

13 Claims, 5 Drawing Sheets

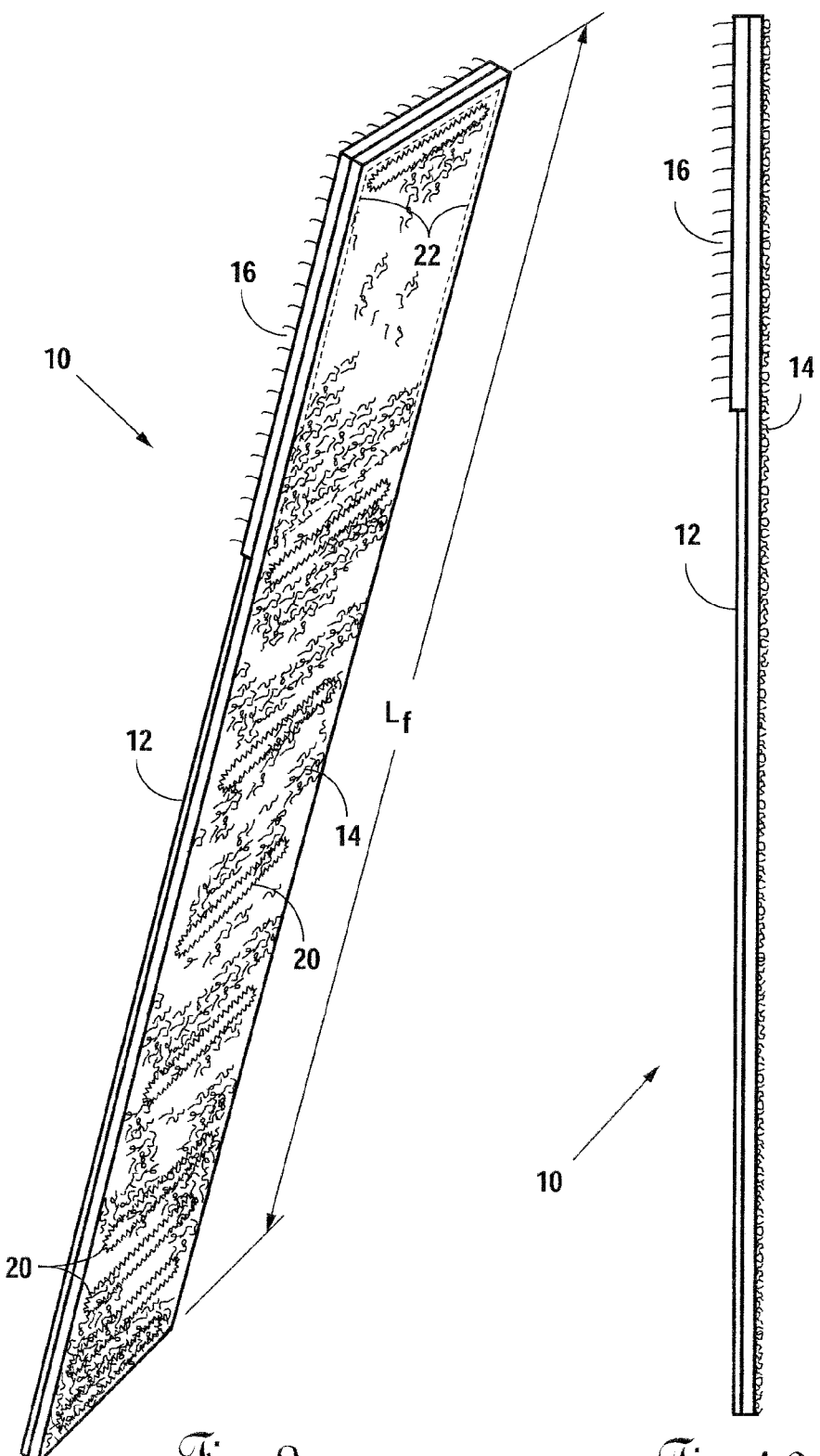

STRAP FOR SECURING ACCESSORIES TO PHOTOGRAPHIC FLASH UNITS

FIELD

This application relates generally to the field of photography, and more specifically to a strap for securing accessories to photographic flash units.

BACKGROUND

In the field of photography, photographers frequently need to secure various accessories to photographic flash units, such as electronic flash units, in order to achieve a desired lighting arrangement. Electronic flash units typically have a fairly smooth plastic outer surface. In the past, photographers have often secured various attachments to electronic flash units with adhesive-backed hook and loop fasteners, such as Velcro™ fasteners, in order to direct or condition the light emanating from the electronic flash units in a desired manner. However, as the prices of electronic flash units have increased substantially over the past few years, photographers have become increasingly reluctant to affix adhesive-backed hook and loop fasteners to their expensive electronic flash units. Thus, there is a need for an improved method and apparatus for securing accessories to photographic flash units.

SUMMARY

A strap for fastening an accessory to a photographic flash unit may have a stretchable substrate; an outer fastener strip attached to the stretchable substrate, the outer fastener strip having one of hook fastener material and loop fastener material; and an inner fastener strip attached to the stretchable substrate, the inner fastener strip having the other of hook fastener material and loop fastener material; wherein the outer fastener strip has at least one slack region having an amount of slack when the stretchable substrate is in an undeflected condition.

BRIEF DESCRIPTION OF THE DRAWINGS

FIG. 9 is a top perspective view of the strap of FIG. 1 in a deflected position.
FIG. 10 is a back view of the strap of FIG. 9.

DETAILED DESCRIPTION

Figure 1:
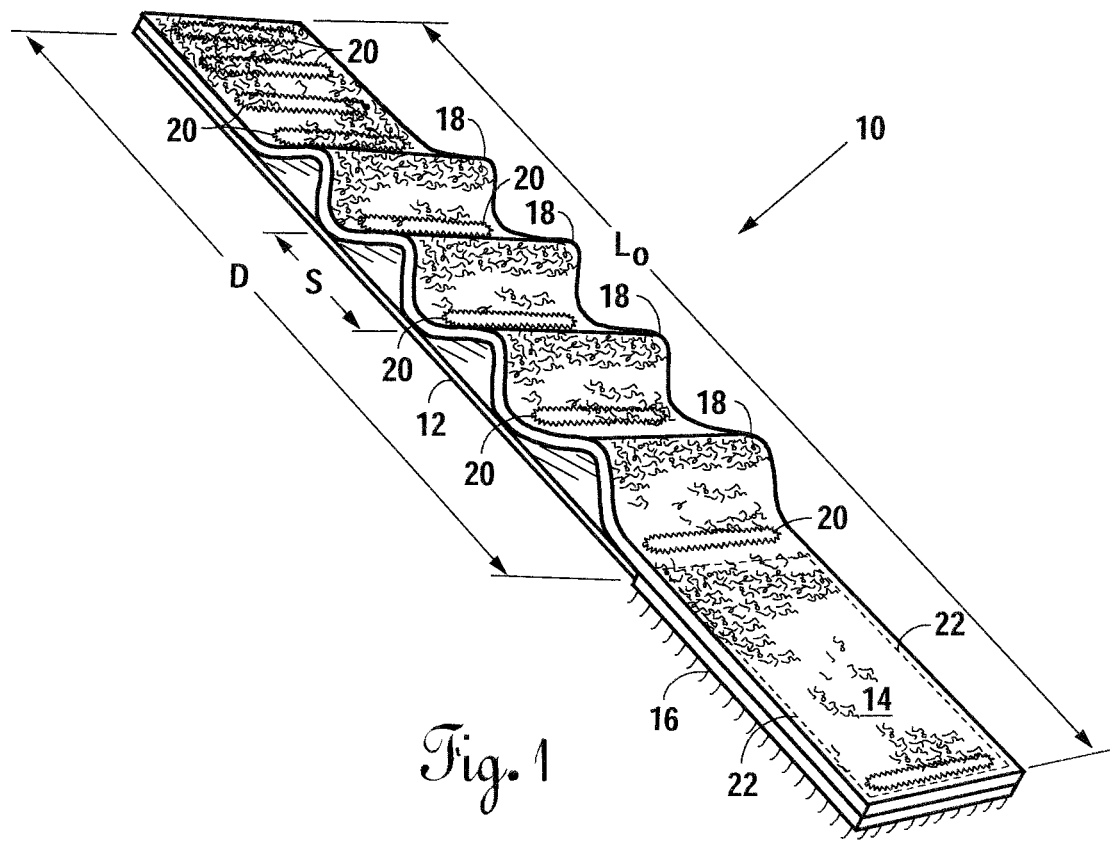
FIG. 1 is a top perspective view of a strap in an undeflected position.
Figure 2:
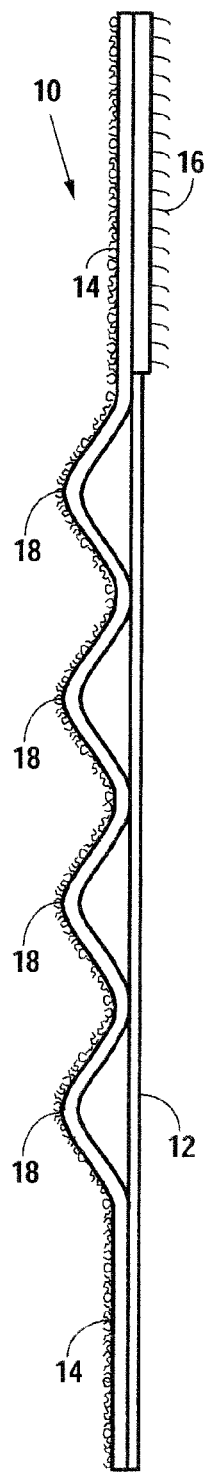
FIG. 2 is a front view of the strap of FIG. 1.

As used herein, the following terms should be understood to have the indicated meanings:

When an item is introduced by "a" or "an," it should be understood to mean one or more of that item.

"Attached" means, with respect to two or more objects, fastened together by any suitable fastener, including but not limited to one or more stitches, staples, brads, rivets, nails, screws, tacks, glue, adhesive, epoxy, welds, or a combination thereof.

"Comprises" means includes but is not limited to.

"Comprising" means including but not limited to.

"Fastener strip" means a strip of material comprising at least one of hook or loop fastener material. A fastener strip may have both hook fastener material and loop fastener material.

"Having" means including but not limited to.

"Hook-and-loop fastener material" means any multi-layer fastener material having a "hook" component and a "loop" component wherein the "hook" component is removably securable to the "loop" component. Hook-and-loop fastener material may include but is not limited to Velcro™ brand hook-and-loop fastener material.

"Hook fastener material" means a "hook" component of hook-and-loop fastener material.

"Loop fastener material" means a "loop" component of hook-and-loop fastener material.

"Non-skid surface" means a surface that has a substantial coefficient of friction with respect to a generally smooth surface.

"Stretchable substrate" means a strip of material that has a capacity for stretching upon application of a tensile force to the strip.

As shown in FIGS. 1-8, a strap 10 for securing an accessory to a photographic flash unit may have a stretchable substrate 12 to which an outer fastener strip 14 and an inner fastener strip 16 are attached by any suitable attachment, such as one or more stitched seams 20, 22, for example. As shown in FIGS. 1-5 and 8, outer fastener strip 14 may be intermittently attached to stretchable substrate 12 at connection points such as seams 20 along a first side of stretchable substrate 12. In some embodiments, one or more of the seams 20 may include a button hole stitch. Stretchable substrate 12 may be made of any suitable material having a non-skid surface and a capacity for stretching upon application of a tensile force, such as SN12000D Slip-Not™ material available from Eastex Products, Inc., Holbrook, Mass., or Free-Band[198] material available from Kent Elastomer Products, Inc., Kent, Ohio, for example. Stretchable substrate 12 may have a knit, woven, or other suitable fabric backing, which may enhance the capacity of stretchable substrate 12 to be sewn, and a "grippy" non-skid surface, such as a rubber or suitable polymer, for example, which may have a plurality of raised dots or other surface features to increase its coefficient of friction and enhance its ability to grab a smooth surface such as ABS plastic. In some embodiments, outer fastener strip 14 may have loop fastener material, and inner fastener strip 16 may have hook fastener material. Alternatively, outer fastener strip 14 may have hook fastener material, and inner fastener strip 16 may have loop fastener material. In some embodiments, each of outer fastener strip 14 and inner fastener strip 16 may have both hook fastener material and loop fastener material. Although outer fastener strip 14 is shown as extending substantially the entire length of strap 10, outer fastener strip 14 may have a length that is less than the entire length of strap 10.

Figure 11:
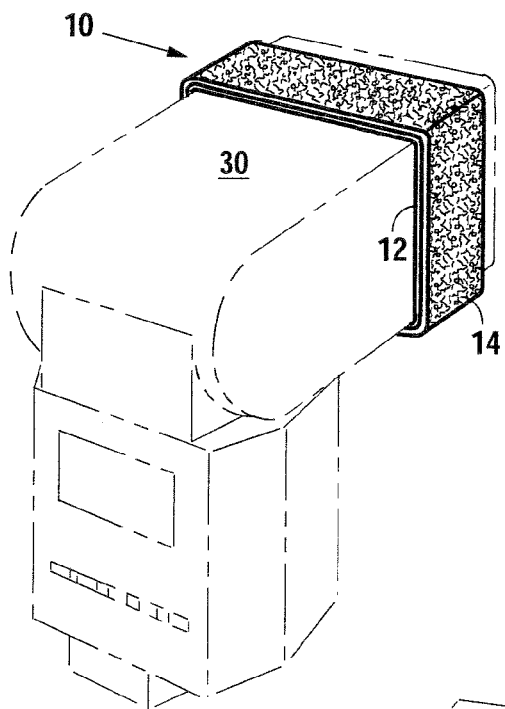
FIG. 11 is a perspective view of the strap of FIG. 9 installed on a photographic flash unit.
Figure 12:
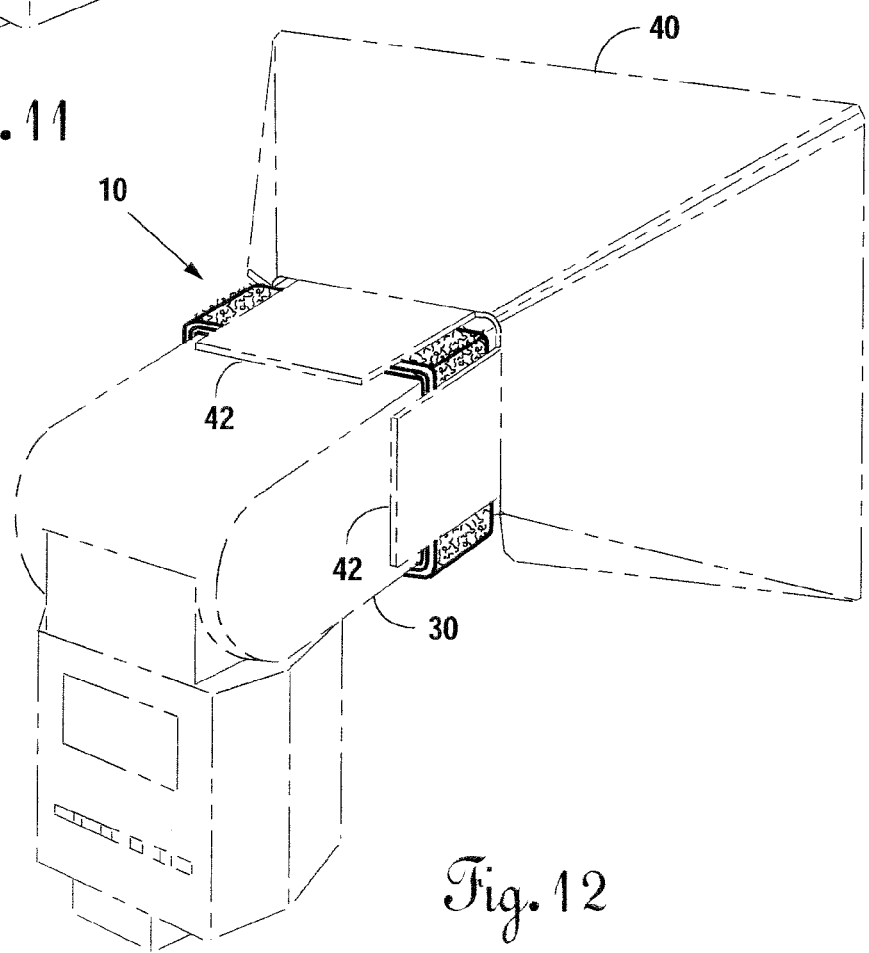
FIG. 12 is a perspective view of the strap of FIG. 9 installed on a photographic flash unit with an accessory secured to the strap.

Outer fastener strip 14 may be configured such that when stretchable substrate 12 is in an undeflected condition as shown in FIGS. 1-8, outer fastener strip 14 may have one or more slack regions 18 between seams. Slack regions 18 are not attached to stretchable substrate 12 except at the seams 20 that bound the slack regions 18, and such seams 20 may be oriented transverse to the length of the stretchable substrate 12 so as not to interfere significantly with its ability to stretch. Although four slack regions 18 are shown in the illustrated embodiments, fewer than four or more than four slack regions 18 may be employed, depending on the particular application. The one or more slack regions 18 give strap 10 an ability to stretch until outer fastener strip 14 is fully extended and all or substantially all the slack has been eliminated from strap 10 as shown in FIGS. 9 and 10. When strap 10 is stretched, it may be wrapped about a photographic flash unit 30 as shown in FIG. 11 such that all or a portion of inner fastener strip 16 is removably secured to outer fastener strip 14 by the interaction of overlapping hook fastener material and loop fastener material, one of which is on inner fastener strip 16 and the other of which is on outer fastener strip 14. In this manner, strap 10 may be wrapped about photographic flash unit 30 such that strap 10 is in a desired state of tension and the non-skid surface of stretchable substrate 12 is in contact with the exterior surface of the photographic flash unit, which holds strap 10 securely in place on photographic flash unit 30. The non-skid surface of stretchable substrate 12 may engage all or a portion of the perimeter of photographic flash unit 30. An accessory 40 having one or more complementary hook or loop fastener material regions such as on tabs 42 may then be secured to strap 10 as shown in FIG. 12. Examples of accessories with hook or loop fastener material that may be attached to strap 10 include but are not limited to those shown in U.S. Pat. No. Des. 342,273 and U.S. Pat. No. Des. 312,471, each of which is incorporated herein by reference.

Strap 10 and its components may be sized in order to fit any desirable photographic flash unit. One embodiment of strap 10 that will accommodate a fairly wide variety of photographic flash units may have an undeflected length $L_o$ of about 9.75 inches and a fully stretched length $L_f$ of about 11.0 inches. In this embodiment, stretchable substrate 12 may be a strip of SN12000D Slip-Not™ material having a width W of about 1.0 inch and an undeflected length D of about 7.25 inches, outer fastener strip 14 may be a strip of Velcro™ brand loop fastener material having a width of about 1.0 inch and a length of about 11.0 inches, and inner fastener strip 16 may be a strip of Velcro™ brand hook fastener material having a width of about 1.0 inch and a length of about 2.5 inches. In this embodiment, each of the slack regions 18 may have a length S of about 1.38 inches in the undeflected condition. Alternatively, the slack regions 18 may not all have the same size. When fully stretched or deflected, this embodiment of strap 10 will have about 3.0 lbs. of tension and will fit many commercially available photographic flash units, such as those available from Nikon™, Canon™, Olympus™, Pentax™, Leica™, Comtax™, Sony™, Minolta™, Sunpak™, Vivitar™, Metz™, Sigma™, and Lumopro™, for example. One exemplary photographic flash unit 30 for which such an embodiment of strap 10 is suitable for use is the SD-900 AF Speedlight™ available from Nikon Inc., Melville, N.Y., which has a perimeter of about 9.5 inches. Of course, strap 10 and its components may be configured to provide any desired amount of tension when stretched to a desired length according to the equation $F=k*x$, where F is the tension force, k is the spring constant for the material of stretchable substrate 12, and x is the change in length (i.e., the amount of stretch) of stretchable substrate 12.

Figure 3:
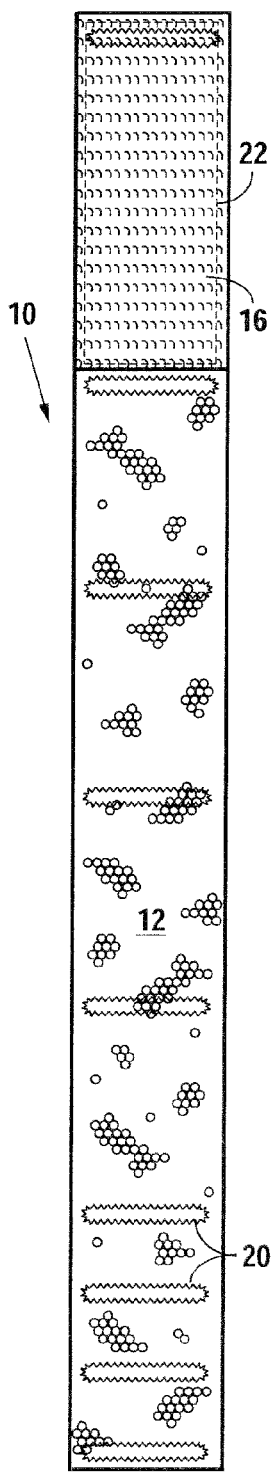
FIG. 3 is a bottom plan view of the strap of FIG. 1.
Figure 4:
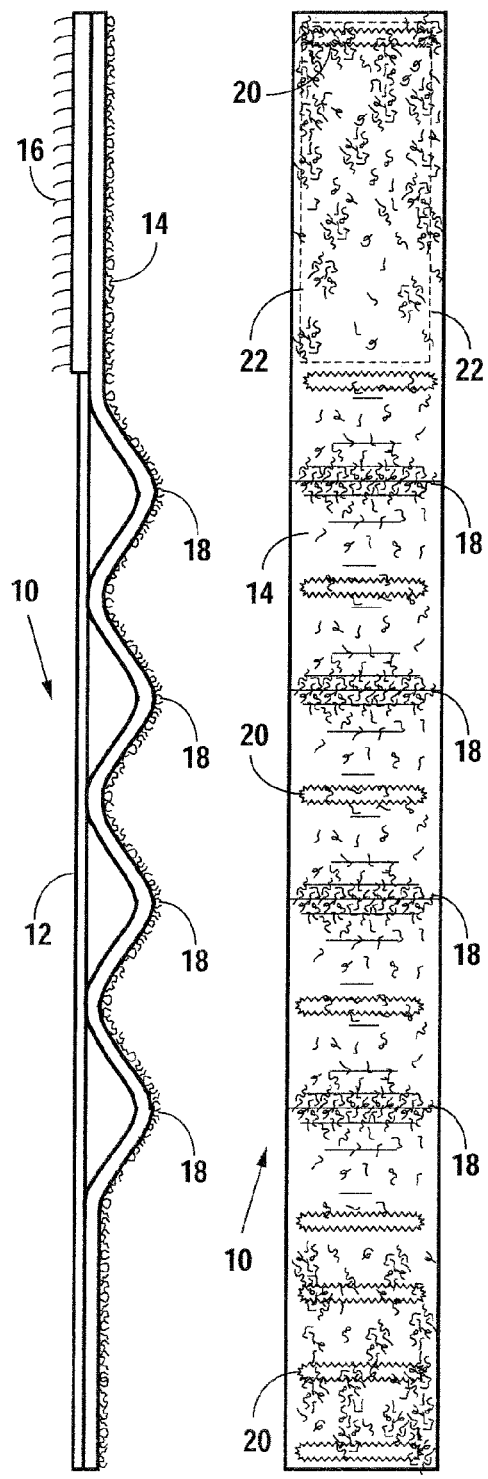
FIG. 4 is a back view of the strap of FIG. 1.
Figure 5:
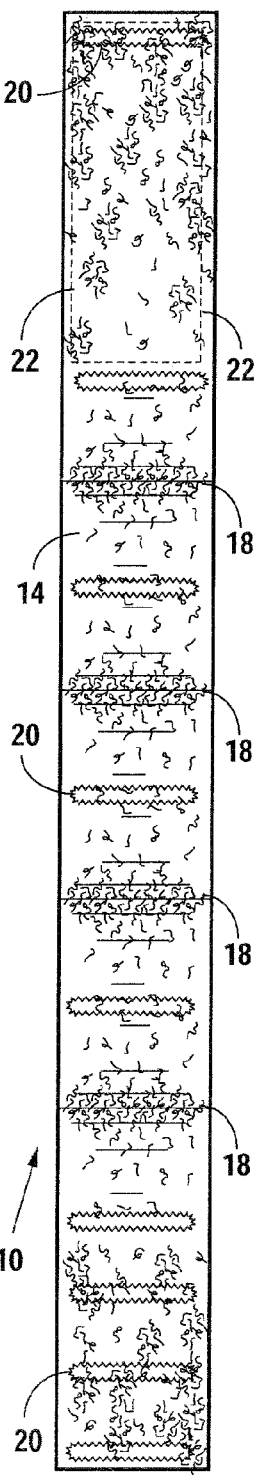
FIG. 5 is a top plan view of the strap of FIG. 1.
Figure 6:
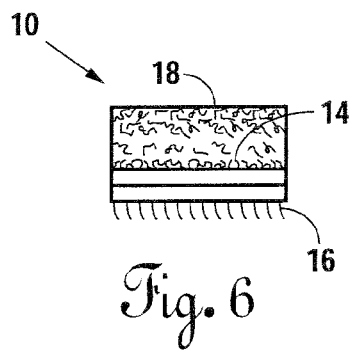
FIG. 6 is a right side view of the strap of FIG. 1.
Figure 7:
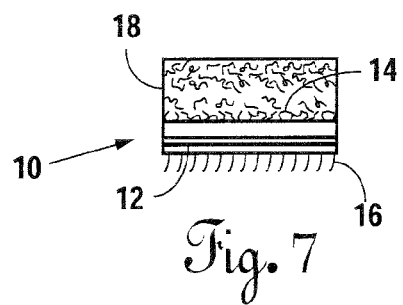
FIG. 7 is a left side view of the strap of FIG. 1.
Figure 8:
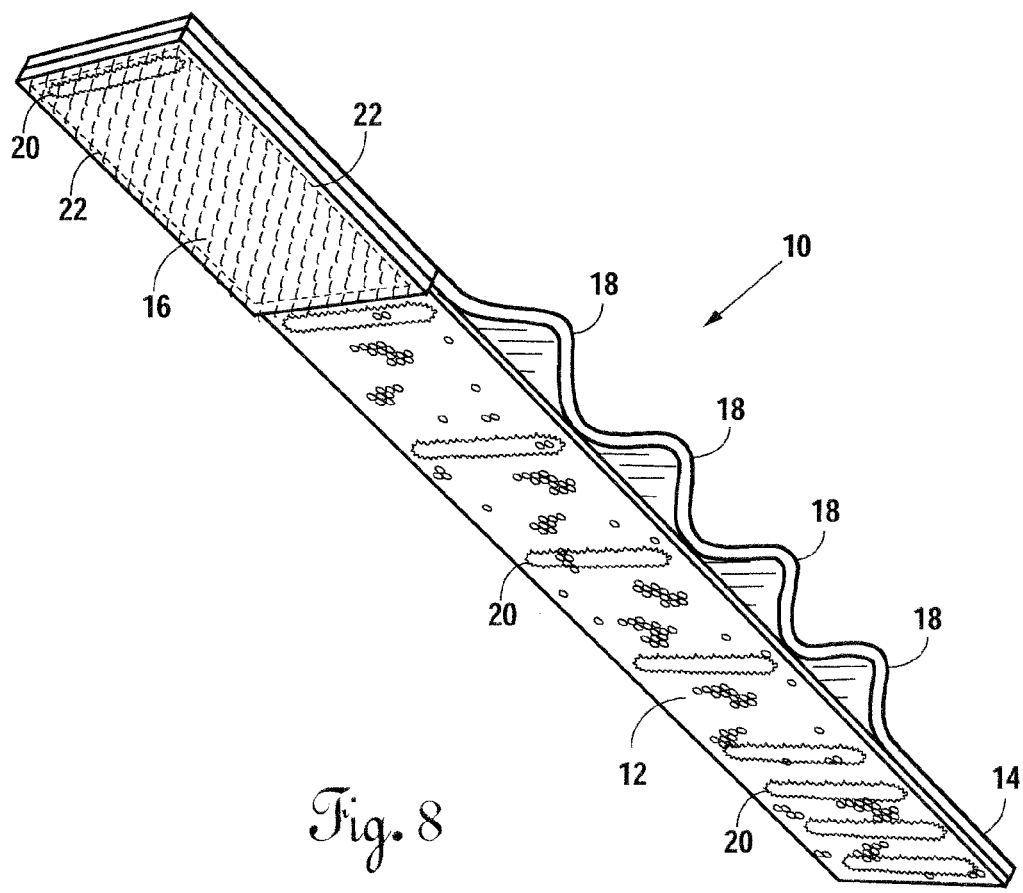
FIG. 8 is a bottom perspective view of the strap of FIG. 1.

In some embodiments, as shown most clearly in FIG. 3, a plurality of spaced apart seams 20 may be provided on an end of strap 10 opposite inner fastener strip 16 to allow the user to trim down the strap 10 for a better fit on smaller photographic flash units. That is, the user may trim strap 10 just outboard of one of the seams 20 by cutting off the undesired portion of strap 10 with scissors, a knife, or other suitable trimming tool in order to shorten the overall length of strap 10 to fit a smaller photographic flash unit. If strap 10 is trimmed in this manner, the remaining seam(s) 20 on that end of strap 10 will keep stretchable substrate 12 and outer fastener strip 14 of strap 10 attached to each other. Although such seams 20 are shown with approximately equal spacing, the spacing of such seams may or may not be the same.

Although the foregoing specific details describe certain embodiments of this invention, persons reasonably skilled in the art will recognize that various changes may be made in the details of this invention without departing from the spirit and scope of the invention as defined in the appended claims and considering the doctrine of equivalents. Therefore, it should be understood that this invention is not to be limited to the specific details shown and described herein.

What is claimed is:

1. A strap for fastening an accessory to a photographic flash unit, comprising:
    a stretchable substrate comprising a non-skid surface;
    an outer fastener strip intermittently attached to a first side of said stretchable substrate at connection points, said outer fastener strip comprising loop fastener material; and
    an inner fastener strip attached to a second side of said stretchable substrate, said inner fastener strip comprising hook fastener material and being disposed at an end of said strap;
    wherein said outer fastener strip comprises a plurality of slack regions between said connection points having an amount of slack when said stretchable substrate is in an undeflected condition; and
    wherein said stretchable substrate is stretchable to a deflected condition such that substantially all of said slack is eliminated and said inner fastener strip is removably securable to said outer fastener strip.

2. The strap of claim 1 wherein each of said plurality of slack regions has substantially the same size.

3. The strap of claim 1 wherein said strap has about 3.0 lbs. of tension in said deflected condition.

4. The strap of claim 3 wherein said strap has a predetermined length adapted to wrap completely around an outer surface of a predetermined photographic flash unit.

5. A strap for fastening an accessory to a photographic flash unit, comprising:
    a stretchable substrate;
    an outer fastener strip intermittently attached at connection points along a first side of said stretchable substrate, said outer fastener strip comprising one of hook fastener material and loop fastener material; and
    an inner fastener strip attached to an opposite side of said stretchable substrate, said inner fastener strip comprising the other of hook fastener material and loop fastener material;
    wherein said outer fastener strip comprises at least one slack region between said connection points, said at least one slack region having an amount of slack when said stretchable substrate is in an undeflected condition, and wherein said stretchable substrate is stretchable to a deflected condition such that substantially all of said slack is eliminated.

6. The strap of claim 5 wherein said inner fastener strip is disposed at an end of said strap and wherein said strap is sized and configured such that said inner fastener strip is removably securable to said outer fastener strip when said stretchable substrate is in said deflected condition.

7. The strap of claim 5 wherein said outer fastener strip and said inner fastener strip are sewn to said stretchable substrate.

8. The strap of claim 5 wherein said stretchable substrate comprises a non-skid surface on an inner side of said substrate.

9. The strap of claim 5 wherein said outer fastener strip extends substantially an entire length of said strap.

10. The strap of claim 5 wherein said inner fastener strip is disposed at an end of said strap and wherein said strap is sized and configured such that said inner fastener strip is removably securable to said outer fastener strip when said stretchable substrate is in said deflected condition.

11. A strap for fastening an accessory to a photographic flash unit, comprising:
- a stretchable substrate comprising a non-skid surface along an inner side of said substrate, said non-skid surface having a coefficient of friction with respect to a smooth plastic surface;
- an outer fastener strip intermittently attached at connection points along an outer side of said stretchable substrate, said outer fastener strip comprising loop fastener material; and
- an inner fastener strip attached to said inner side of said stretchable substrate, said inner fastener strip comprising hook fastener material and being disposed at an end of said strap;
- wherein said outer fastener strip comprises a plurality of slack regions between said connection points, said plurality of slack regions having an amount of slack when said stretchable substrate is in an undeflected condition; and
- wherein said stretchable substrate is stretchable to a deflected condition such that substantially all of said slack is eliminated and said inner fastener strip is removably securable to said outer fastener strip.

12. The strap of claim 11 wherein each of said plurality of slack regions has substantially the same size.

13. The strap of claim 11 wherein said strap has about 3.0 lbs. of tension in said deflected condition.

* * * * *